Figure 1:
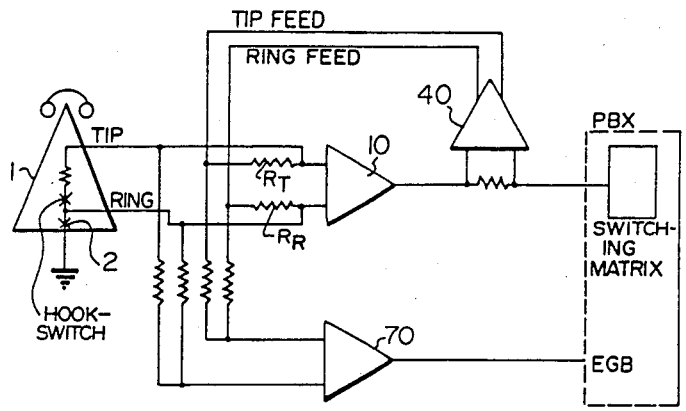

United States Patent [19]

Beirne

[11] Patent Number: 4,540,854
[45] Date of Patent: Sep. 10, 1985

[54] SUBSCRIBER LINE INTERFACE CIRCUIT

[75] Inventor: Patrick R. Beirne, Kanata, Canada

[73] Assignee: Mitel Corporation, Kanata, Canada

[21] Appl. No.: 518,191

[22] Filed: Jul. 28, 1983

[30] Foreign Application Priority Data

Dec. 17, 1982 [CA] Canada ................................. 418003

[51] Int. Cl.³ ............................................... H04Q 3/00
[52] U.S. Cl. ............................ 179/18 FA; 179/18 AH
[58] Field of Search ........ 179/18 FA, 18 AD, 18 AH,
179/18 HB

[56] References Cited

U.S. PATENT DOCUMENTS 4,178,485 12/1979 Cowpland et al. ............ 179/18 FA
4,182,936 1/1980 Beirne et al. .................. 179/18 AH
4,281,219 7/1981 Cowpland et al. ............ 179/18 FA
4,284,853 8/1981 Lechner ......................... 179/18 HB
4,320,260 3/1982 Lechner ......................... 179/18 FA Primary Examiner—Gene Z. Rubinson
Assistant Examiner—Elio Divito
Attorney, Agent, or Firm—Alan H. Levine

[57] ABSTRACT

A transformerless, fully balanced, telephone line circuit is provided. Two differential amplifiers are employed, one for incoming signals and the other for outgoing signals. The latter drives the line with two out-of-phase, equal amplitude signals. A comparator detects grounding of either TIP or RING at the telephone to accommodate international applications.

9 Claims, 2 Drawing Figures

SUBSCRIBER LINE INTERFACE CIRCUIT

The present invention relates to transformerless telephone line circuits, and more particularly to a line circuit capable of accommodating European ground button telephones. The line circuit, furthermore, provides fully balanced signals driving the telephone line on one side, while providing a single wire for the associated junctor, CODEC or switch, such as in a PBX, on the other side.

A useful discussion of similar line circuits is found in U.S. Pat. No. 4,178,485 issued to Cowpland et al on Dec. 11th, 1979, to which the reader is referred.

Normally, the line circuit is located in close proximity to the switch while having its associated station set (i.e. telephone) relatively remote. Many modern PBX systems require a single wire as input to the switching matrix, and the connection between two telephones is established by interconnecting their so-called junctor wires. The relatively remote telephone, on the other hand, the operation of which is well understood, must be connected by a two-wire line and supplied with dc. In addition, it is preferable that the two-wire line not only should be terminated at the line circuit by a balanced matching impedance, but that it also should be driven by a balanced output signal. The advantage of the latter requirement becomes more pronounced the longer the two-wire line, i.e. the more remote the telephone set.

In many European telephone systems, so-called ground button telephones are used, in which a button switch in the telephone set momentarily grounds either of the TIP or RING leads of the line as an additional means of signalling. A line circuit must be capable of detecting any momentary actuation of the ground button (hereinafter EGB for European Ground Button) and of signalling its associated PBX accordingly, to be suitable for European systems. Needless to say, such detection must be accomplished without interference with its other functions.

Accordingly, the present invention has two primary objects: to provide a transformerless, balanced two-wire to single-wire line circuit that drives the two-wire line with a balanced signal, i.e. that the TIP and RING wires are driven by two signals equal in amplitude but opposite in phase, and to provide a line circuit capable of detecting the momentary actuation of an EGB. Such primary objects are, of course, additional to the other requirements placed on state of-the-art line circuits.

In order to satisfy the first of the two primary objects, the line circuit utilizes a differential input amplifier which connects the balanced input signal to a single-ended output signal that is fed to the junctor, CODEC or switch, and a differential output amplifier which has both differential input, and output, for converting the other party's single-ended signal, supplied by the junctor, CODEC or switch on the same single wire, to a balanced drive output signal on TIP and RING, without the input signal being also output to any significant degree.

The detection of the EGB signal is accomplished by detecting the imbalance in dc current through the TIP and RING leads, which results when either side is grounded. This is conveniently accomplished with a single comparator or differential amplifier, by comparing the total current fed into the matching resistors of the line to the total current of both TIP and RING leads and indicating EGB actuation upon a difference exceeding a predetermined threshold being detected.

Accordingly, the present invention provides a telephone line circuit for connection between a balanced two-terminal port and an unbalanced terminal comprising: a first differential amplifier circuit for receiving incoming signals from the balanced two-terminal port and converting them to unbalanced signals; a translation circuit for applying the unbalanced signals to the unbalanced terminal; and a second differential amplifier circuit having a pair of differential input terminals coupled across the translation circuit, the second differential amplifier circuit having a pair of balanced output terminals for driving the balanced two-terminal port with balanced outgoing signals representative of signals originating from the unbalanced terminal. The telephone line circuit further comprises apparatus for detecting an imbalance in dc-current flowing into and out of the balanced two-terminal port to indicate grounding of either side of the balanced two-terminal port.

In a preferred embodiment, the imbalance in dc-current is detected in a comparator comparing the average voltage at the balanced two-terminal port and the average voltage at the pair of balanced output terminals of the second differential amplifier circuit, in which the difference between the voltages is proportional to the dc current, whereby, upon an imbalance in dc-current exceeding a predetermined value, the output voltage of the comparator changes indicating an imbalance. Such indication signals the associated switching system or PBX that the EGB in the associated telephone has been momentarily actuated.

Figure 2:
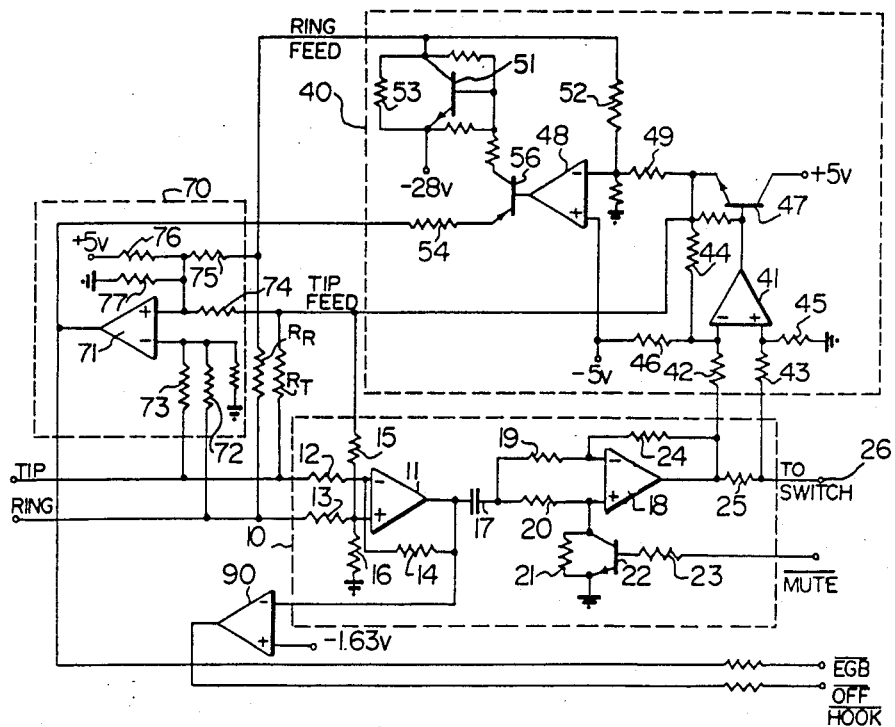

The preferred embodiment of the present invention will now be described in conjunction with the accompanying drawings in which:

FIG. 1 is a block schematic of a line circuit according to the present invention in a simplified, general form; and FIG. 2 is a detailed schematic of the line circuit of FIG. 1.

Referring now to FIG. 1, the line circuit of the present invention comprises three main components. A balanced-to-unbalanced signal converter in the form of an amplifier 10, having a pair of differential inputs and an output, receives the signals supplied by the telephone line TIP and RING leads connected to a telephone 1 (which includes an EGB switch 2 connecting the TIP or RING lead to ground), and feeds its single-ended output to the switching matrix of a local PBX. A differential input/balanced output amplifier 40 senses signals to and from the PBX (which originate with the parties to the telephone connection) and feeds the TIP and RING leads with its pair of differential outputs through resistors $R_T$ and $R_R$, respectively.

The third component is comparator or differential amplifier 70, which essentially compares the average voltage on the TIP and RING leads with the average voltage at the outputs of the amplifier 40. In other words, the amplifier 70 compares the average voltages across the resistors $R_T$ and $R_R$, in order to indirectly determine whether a difference in the dc currents flowing through the TIP and RING leads of the telephone line exceeds a predetermined value, in the present embodiment 20 mA. Should such difference be exceeded, the output of the amplifier 70 goes low indicating to the PBX that the EGB in the subscribers telephone has been depressed.

FIG. 2 shows a detailed schematic of the preferred form of line circuit. The TIP and RING leads are connected to the differential inputs of an operational amplifier 11 through resistors 12 and 13, respectively, each of which is 190K ohm; a negative feedback resistor 14, having a value of 15K ohm, is connected between output and inverting input of the amplifier 11. A resistor 15 applies a TIP FEED signal to the non-inverting input of the amplifier 11, its value is 167K ohm. A 16K ohm resistor 16 connects the non-inverting input of the amplifier 11 to ground. Thus the output signal $V_{11}$ of the amplifier 11 approximately equals $$V_{11} = 0.08 \, (V_R - V_T) + 0.009 \, V_{TF},$$

where $(V_R - V_T)$ is the signal across TIP and RING leads, and $V_{TF}$ is the TIP FEED signal at the output of the amplifier 40. The above formula shows how common mode signals on the telephone line cancel each other if equal. The signal $V_{11}$ is ac-coupled through capacitor 17 (0.1 microfarad) to differential amplifier 18 by means of resistor 19 (40K ohm) to the inverting input, and by means of resistor 20 (100K ohm) to the non-inverting input. The latter input is also connected via resistor 21 (802K ohm) to ground, parallel to which is connected the collector and emitter of a transistor 22. The base of transistor 22 is controlled through resistor 23 (14K ohm) from a $\overline{\text{MUTE}}$ terminal from the PBX, which causes the transistor 22 to switch off and reduce the gain of the amplifier 18 to zero when necessary, which is sometimes a requirement in PBX systems.

When the transistor 22 is switched on, and with a negative feedback resistor 24 of 40K ohm, the gain provided by the amplifier 18 to the ac-coupled $V_{11}$ signal approximately equals eight. The output signal $V_{18}$ of amplifier 18 is applied to the switching matrix of the PBX by means of series resistor 25 (604 ohm) at terminal 26. When two telephones are interconnected via the switching matrix in the PBX, this is equivalent to their terminals 26 being interconnected through a small resistance, which represents the loss causes by the switching matrix, and which, therefore, depends on the type of switching matrix in the system. The important point is that the terminal 26 will have signal components of both interconnected telephones, while the output of the amplifier 18, being a virtual ground, will only have signals provided by it.

Both the output of the amplifier 18 and the terminal 26 are applied to the differential inputs of the amplifier 40. This $V_{18}$ is applied to the inverting input of amplifier 41 via resistor 42, while the signals $V_{26}$ at the terminal 26 are applied to the non-inverting input of the amplifier 41 via resistor 43. Because it is required that the output of the amplifier 41 have only components from the other telephone, the resistors 42 and 43 are not equal, being 100K ohm and 19K ohm, respectively.

It will be convenient to designate two interconnected telephones A and B, A being the one connected to the present line circuit; for designation of the corresponding telephones, subscripts a and b will be used. Accordingly, the resistor 42 should have such value as to apply a fraction of the signal $V_a$ that equals the A signal component present at the terminal 26, and which is applied to the amplifier 41 via the resistor 43. The result is that a component of signal $V_b$, and a small component of the signal $V_a$ appears at the output of the amplifier 41. The small component of $V_a$ modifies the impedance, since $R_T/R_R$ would be 230 ohms, and the matching input impedance of the telephone would be 300 ohms.

Resistor 44 (170K ohm) provides the negative feedback of the amplifier 41, and, together with resistors 42, 43, 45 (190K ohm) and 46 (566K ohm), determines its gain. The resistor 46 connects a $-5$ V bias voltage to the inverting input, and causes the emitter of transistor 47, which feeds the TIP lead via $R_T$ with dc current, to have a quiescent dc voltage of $+1.5$ V. The signal $V_{41}$ at the output of the amplifier 41, which appears unaltered at the emitter of the transistor 47, is applied to the inverting input of amplifier 48 via resistor 49 (190K ohm). Thus $V_{41}$, which is applied to the TIP FEED, is inverted in the amplifier 48, and then inverted twice in transistors 56 and 51, and is applied to the RING FEED. Accordingly, the TIP and RING leads have two out-of-phase, equal, signals applied to them that represent only the signals $V_b$ of telephone B. The total gain of the amplifier loop comprising the amplifier 48 and the transistors 56 and 51 is adjusted by means of resistor 52 (190K ohm) to be $-1$, in order to apply a RING FEED signal equal in amplitude to the TIP FEED signal. In addition, the transistor 51 provides the dc current feed to the RING lead. The $-5$ V dc bias applied to the non-inverting input of the amplifier 48 causes the RING FEED to be quiescent at $-23.5$ V, which means that its dc potential with respect to the TIP FEED is $-25$ V. Resistor 53 (260 ohm) in parallel with the transistor 51 reduces the power dissipated in the transistor, which protects it at higher emitter-collector voltage. The function of resistor 54 (5K ohm) will be discussed later in connection with the EGB operation. The remaining resistors are biasing resistors.

By way of explanation assume that each talker at the telephones A and B is generating a signal $V_a = V_b = 1.0$ Vrms across the TIP and RING leads at each line circuit. Given the circuit as explained so far, this will actually result in a TIP FEED signal $V_{TF} = 0.12 \, V_a$ approximately. Thus $V_{11}$ is $$V_{11} = -0.08 \, V_b + 0.09 \times 0.12 \, V_a = 0.07 \text{ Vrms}.$$

Since the gain of the amplifier 18 equals eight, its output $V_{18}$ is $$V_{18} = 8 \times V_{11} = 0.56 \text{ Vrms}.$$

Since the resistance equivalent to the total switching loss is approximately 150 ohm, and given that the resistor 25 equals 604 ohm, the signal $V_{26}$ at the terminal 26 will be $$V_{26} = 0.31 \, V_a + 0.25 \, V_b.$$

The amplifier 41 provides a different gain for each of its differential inputs. The resistor values given above yield a gain of $-0.9$ for the signal $V_{18}$, and a gain of 2 for the signal $V_{26}$, while the $-5$ V reference applied via the resistor 46 appears inverted and attenuated at $+1.5$ Vdc at its output. Thus $V_{TF}$ (which is almost identical with $V_{41}$) is given by $$V_{TF} = 1.5 - 0.9 \times 0.56 \, V_a + 2 \, (0.31 V_a + (0.25 \, V_b), \text{ or}$$

$$V_{TF} = 1.5 + 0.12 \, V_a + 0.5 \, V_b.$$

Since $V_{TF}$ feeds the TIP lead via the resistor $R_T$ (230 ohm), it can be seen that a significant fraction of the B telephone signal is relayed to A, while a small fraction of $V_a$ alters the effective voice-frequency resistance of $R_T$ to raise it to the required value of 300 ohm for purposes of matching and balancing the telephone line, ($R_{TF}=230/(1-2\times 0.12)=302$). This is the result of forcing a signal current into $R_T$ opposite that supplied by the TIP lead, and $R_T$ appears to the TIP lead to have a higher resistance than its ohmic value at signal frequencies. The $V_{TF}$ signal is also applied, strongly attenuated, to the non-inverting input of the amplifier 11 via the resistor 15 in order to cancel the component of $V_b$ which appears across the TIP and RING leads and goes to amplifier 11 through resistors 12 and 13.

Analogous to the above description, the RING FEED signal $V_{RF}$ is given by $$V_{RF} = -23.5 - 0.12\, V_a - 0.5\, V_b.$$

The above comments with respect to $R_T$ apply also to $R_R$, and the result is that the telephone line is matched at voice frequencies with an impedance of approximately 600 ohm.

The open loop gain of the cascade of the transistors 56 and 51 equals six, which is low enough to ensure stability. The employment of the two transistors 56 and 51 permits operation of the amplifier 48 on a limited power supply of $+5/-8$ V and yet drives the RING FEED with a signal biased around $-25$ V. The collector of the transistor 51 is able to swing to as low as $-27.5$ V, corresponding to a relatively loud audio signal.

The comparator 70 is comprised of a differential amplifier 71 having an inverting input thereof connected to the TIP and RING leads through summing resistors 72 and 73 (270K ohm), respectively, and a non-inverting input thereof connected to the TIP FEED and RING FEED through summing resistors 74 and 75 (320K ohm), respectively. The voltage divider comprised of resistors 76 (348K ohm) and 77 (296K ohm) applies a reference voltage of $+2.3$ V to the non-inverting input of the amplifier 71.

Upon actuation of the EGB in the telephone, either of the TIP or RING leads is connected momentarily to ground. This creates an unbalanced condition, during which the dc current flowing out on the TIP lead from the line circuit will be different from the dc current flowing into the RING lead. This imbalance should be recognized as a valid signal only when the current difference is 20 mA or more. Thus, the condition to be detected may be expressed as follows:

$$I_R > I_T + 20\ mA,$$

or substituting the voltages across the resistors $R_R$ and $R_T$ for $I_R$ and $I_T$ $$(V_R - V_{RF})/R_R > (V_{TF} - V_T)/R_T + 20\ mA,$$

and with $R_R = R_T = 230$ ohm, we obtain $$(V_R + V_T) > V_{TF} = V_{RF} + 4.6\ V.$$

In order to remain within the power supply limits, the above inequality is scaled down by dividing by four.

As the EGB is actuated $(V_R + V_T)$ will cause an increase of voltage at the inverting input of amplifier 71 and its output will become more negative, which signal is applied to the PBX via terminal $\overline{EGB}$. The output of the amplifier 71, however, also controls the emitter of the transistor 56 via the resistor 54, which in turn controls the collector voltage of transistor 53. The amplifier 71 operates in a linear region between $-3$ and $-6$ V, in response to EGB being activated, thereby controlling the RING lead current via the transistors 56 and 53, and maintaining the RING current at 20 mA above the TIP current.

An off-hook detector is provided in the line circuit by means of comparator 90, which senses the dc output of the amplifier 11 and compares it to a reference voltage ($-1.63$ V) at the non-inverting input of the comparator 90. The comparator 90 gives an off-hook indication when a current of 10 mA or more flows between TIP and RING leads, which corresponds to the placing of a maximum resistance of 2.2K ohm across TIP and RING. The off-hook indication is relayed to the PBX via terminal $\overline{OFFOOK/}$.

The embodiments of the invention in which an exclusive property or privilege is claimed are defined as follows:

1. A telephone line circuit for connection between a balanced two-terminal port and an unbalanced terminal comprising:
    (a) first differential amplifier means for receiving incoming signals from said balanced two-terminal port and converting them to unbalanced signals;
    (b) circuit means for applying said unbalanced signals to said unbalanced terminal;
    (c) second differential amplifier means having a pair of differential input terminals coupled across said circuit means for receiving signals originating from said unbalanced terminal, and a pair of balanced output terminals for driving said balanced two-terminal port with a pair of balanced outgoing signals representative of said signals received from the unbalanced terminal;
    (d) means for detecting an imbalance in dc-current flowing into and out of said balanced two-terminal port, and indicating grounding of either side of said balanced two terminal port in response thereto; and
    (e) means for limiting said dc-current to a predetermined value in response to detection of said imbalance.

2. A telephone line circuit as defined in claim 1, said means for detecting an imbalance comprising a comparator for comparing the average voltage at said balanced two-terminal port and the average voltage at said pair of balanced output terminals of said second differential amplifier means, said comparator indicating a predetermined imbalance in said dc-current by a change in its output voltage.

3. A telephone line circuit as defined in claim 1 or 2, said first differential amplifier means comprising:
    (a) an input amplifier having inverting and non-inverting inputs resistively coupled to said balanced two-terminal port; and
    (b) an output amplifier, capacitively coupled to the output of said input amplifier, having an unbalanced output connected to one side of said circuit means.

4. A telephone line circuit as defined in claim 1 or 2, said circuit means being a resistor, and second differential amplifier means comprising:
    (a) an input amplifier having inverting and non-inverting inputs coupled across said resistor;
    (b) an output amplifier, dc-coupled to the output of said input amplifier; and
    (c) the output of said input amplifier driving one side of said balanced two-terminal port, and the output of said output amplifier driving the other side of said balanced two-terminal port.

5. A telephone line circuit as defined in claim 2, wherein:
(a) said first differential amplifier means comprises a balanced input amplifier capacitively coupled to an output amplifier having an unbalanced output;
(b) said circuit means is a resistor, one side of which is connected to said unbalanced output of said output amplifier;
(c) said second differential amplifier means comprises a first amplifier having its differential input terminals coupled across said circuit means and having its output resistively coupled to a second amplifier; and
(d) the output of said first amplifier applies a first signal to one side of said balanced two-terminal port through a first resistor, and the output of said second amplifier applies a second signal to the other side of said balanced two terminal port through a second resistor, said first and second signals being of equal amplitude and out-of-phase.

6. A telephone line circuit as defined in claim 5, wherein said comparator is comprised of a differential amplifier having inverting and non-inverting inputs, said inverting input being connected to said balanced two-terminal port via a first pair of summing resistors and said non-inverting input being connected to said first and second resistors via a second pair of summing resistors.

7. A telephone line circuit as defined in claim 5 or 6, said first and second resistors being equal in value.

8. A telephone line circuit as defined in claim 6, said comparator having its output connected to an associated switching system to signal said change in the output voltage.

9. A telephone line circuit as defined in claims 5, 6 or 8, wherein said first and second resistors are equal, and further comprising:
(a) a comparator for indicating an off-hook condition of a telephone associated with said line circuit by comparing the dc-voltage of said output amplifier to a predetermined reference voltage.

* * * * *